(12) United States Patent
Liu

(10) Patent No.: US 12,734,626 B2
(45) Date of Patent: Sep. 15, 2026

(54) POSITIONER AND GUIDING DEVICE HAVING POSITIONER

(71) Applicant: SUPER POWER TOOLS CO., LTD., Taichung City (TW)

(72) Inventor: Yu-Chun Liu, Taichung City (TW)

( * ) Notice: Subject to any disclaimer, the term of this patent is extended or adjusted under 35 U.S.C. 154(b) by 271 days.

(21) Appl. No.: 18/742,380

(22) Filed: Jun. 13, 2024

(65) Prior Publication Data

US 2025/0381632 A1 Dec. 18, 2025

(51) Int. Cl.
*B23Q 3/00* (2006.01)
*B23Q 3/18* (2006.01)

(52) U.S. Cl.
CPC .................................... *B23Q 3/18* (2013.01)

(58) Field of Classification Search
CPC ... B23Q 3/18; B23Q 3/00; B23Q 3/04; B23Q 3/06; B25B 1/02; B25B 1/2421; B25B 1/2457; B25B 11/00; B25B 11/02
See application file for complete search history.

(56) References Cited

U.S. PATENT DOCUMENTS 5,695,178 A * 12/1997 Lenzkes .................. B25B 5/006 269/93
11,077,531 B2 * 8/2021 Chang ....................... B25B 1/02
2008/0084017 A1 * 4/2008 Barziza .................. B23Q 3/103 269/100
2015/0000109 A1 * 1/2015 Plank ..................... B23Q 1/037 269/299
2021/0245316 A1 * 8/2021 Pulsifer .................. B23Q 11/08
2025/0381632 A1 * 12/2025 Liu .......................... B23Q 3/18
2026/0009420 A1 * 1/2026 Pugh ...................... B23Q 3/102

* cited by examiner

*Primary Examiner* — Lee D Wilson
(74) *Attorney, Agent, or Firm* — Egbert, McDaniel & Swartz, PLLC

(57) ABSTRACT

Disclosed is a positioner and a guiding device having a positioner. The positioner has a base, a brake structure, and a front seat. A shaft is provided on the base, and its bottom is coupled to a bearing block. A pivot pivotally passes through the shaft along the diameter of the shaft. The brake structure includes a handle which extends to form two first cams opposite to each other. Two second cams are each axially connected to each first cam, the pivot pivotally passes through each first cam and each second cam, and each second cam abuts the base. The front seat is located at the front side of the base, each first cam is used to urge the front seat to move forward, and each second cam is used to restrain the movement of the shaft for driving the bearing block by abutting against the base.

6 Claims, 9 Drawing Sheets

POSITIONER AND GUIDING DEVICE HAVING POSITIONER

CROSS-REFERENCE TO RELATED APPLICATIONS

Not applicable.

BACKGROUND OF THE INVENTION

The present invention relates to a tool for woodworking, in particular to a positioner and a guiding device having a positioner.

Woodworking tools use a worktable on which the workpiece to be cut is placed. The worktable or workpiece is then pushed toward the rotating cutting tool, allowing the cutting edge of the tool to cut the workpiece.

When the workpiece is placed on the worktable, a fixture or other tool is required to position it. This ensures that the workpiece remains fixed and does not move during the process of moving the worktable so that the workpiece is cut by the cutting tool. Alternatively, a guiding device can be provided on a fixed worktable. This guiding device has a guiding surface against which one side of the workpiece is placed. The workpiece is then pushed toward the cutting tool, with the guiding surface directing its movement in a specific direction toward the cutting tool.

SUMMARY OF THE INVENTION

The main purpose of the present invention is to provide a positioner and a guiding device having a positioner.

In order to achieve the above purpose, the present invention adopts the following technical solution.

A positioner has a base, a first slider protruding from the bottom of the base, a limiter being provided on the upper side of the base, and two supports being formed on the base laterally opposed to each other, wherein the limiter is interposed between the supports, and the base forms two cavities, with each of the cavities forming a baffle wall at the front side.

A shaft stands upright on the base, and the limiter forms a restriction on the diametrical outer circumference of the shaft.

A bearing block is located at the bottom of the base, and the bearing block is located at the axial extension of the shaft, with the bearing block having two bearing faces located on each of the two sides at the top of the bearing block.

A bolt axially connects the bearing block and the shaft, causing the shaft to move the bearing block and being positioned at a first position or a second position, the first position being lower than the second position.

A pivot pivotally passes through the shaft along the diameter of the shaft.

A brake structure is provided, including a handle, two first cams, and two second cams, wherein the handle extends to form each of the first cams, and the first cams are laterally opposed to each other. Each of the second cams is axially connected to each of the first cams, and each of the first cams is located between the second cams. The pivot axially passes through each of the first cams and each of the second cams, allowing the brake structure to rotate with the pivot as a center, and each of the second cams abuts against each of the supports.

A front seat is located at the front side of the base, with the front side of the front seat forming an abutting side, and the rear side of the front seat being opposite to each of the first cams. A second slider protrudes from the bottom of the front seat, and two hooks protrude from the rear side of the front seat, with each of the hooks entering each of the cavities, and each of the baffle walls forming an obstacle against each of the hooks. Each of the cavities has a length along the direction toward the front side and the rear side of the base that is greater than the length of the hook, thereby allowing the base and the front seat to be connected in a relatively front-to-back sliding manner.

Wherein each of the first cams protrudes at its circumferential edge to form a pressing surface, and each of the first cams urges the front seat to move forward through each of the pressing surfaces. Each of the second cams protrudes at its circumferential edge to form an abutting surface, and each of the second cams presses against each of the supports through each of the abutting surfaces, thereby restricting the shaft from moving upward. When the bearing block is positioned at the first position, the front seat is adjacent to the base and the brake structure restricts the shaft from moving upwardly through the pivot, and when the bearing block is positioned at the second position, the pressing surface urges the front seat to move in the direction away from the base.

A guiding device is also disclosed, comprising a guiding plate, an abutting member, and the positioner as described above, wherein the guiding plate is an elongated, plate-like structure having a guiding side and a placement side, with the guiding side and the placement side being located between the two ends of the guiding plate, respectively, and the guiding side being adjacent to the placement side. The guiding plate forms a sliding groove extending to at least one end of the guiding plate, with the abutting member being connected to the other end and extending to the placement side.

The first slider, the bearing block, and the second slider slide into the sliding groove from one end of the guiding plate, allowing the brake structure to restrain the bearing block, with each of the bearing faces abutting against the guiding plate, thereby positioning the positioner. The front seat is interposed between the base and the abutting member, and the abutting member forms a bearing side opposite to the abutting side, thereby allowing the front seat and the abutting member to clamp a worktable therebetween, and the guiding side provides for a workpiece with lateral abutment and guides the sliding direction of the workpiece.

The positioner can be placed on the worktable of the machining tool to position the workpiece for machining and can guide the workpiece to move relative to the cutting tool on the worktable. The guiding device uses the positioner mounted on the worktable to direct the workpiece toward the cutting tool, enabling the cutting tool to complete the machining process.

DETAILED DESCRIPTION OF THE INVENTION

Figure 1:
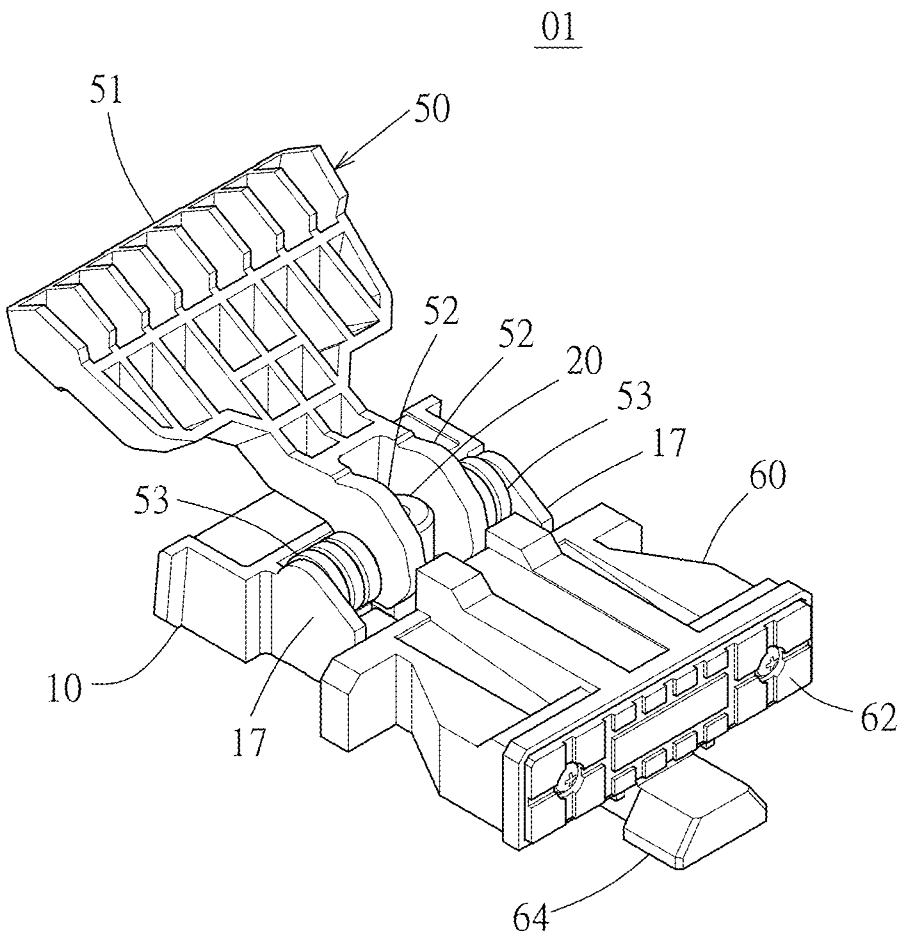
FIG. 1 is a perspective view of the positioner of a preferred embodiment of the present invention.
Figure 2:
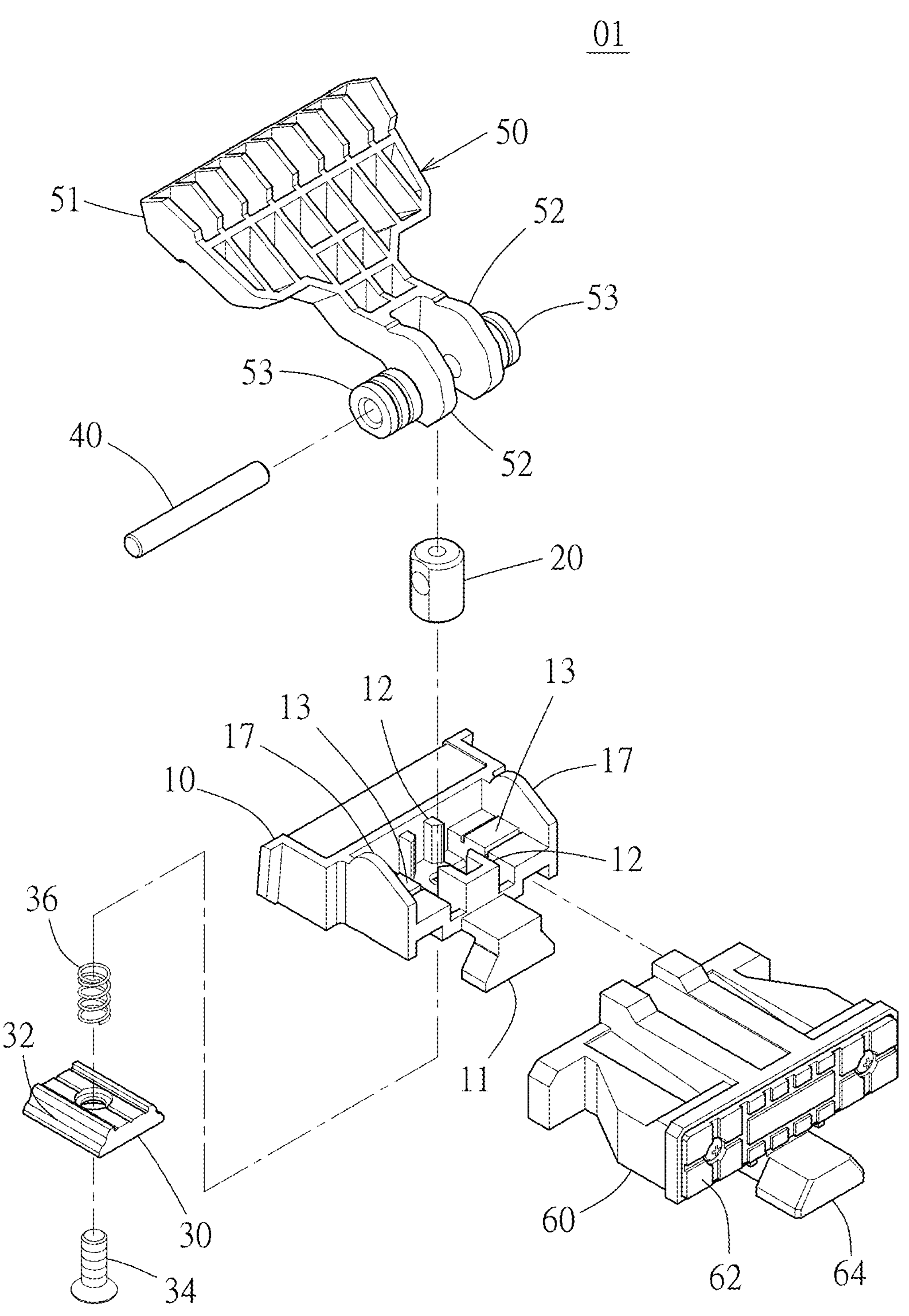
FIG. 2 is an exploded perspective view of the positioner of the preferred embodiment of the present invention.

Please refer to the drawings for a preferred embodiment of the present invention, but these embodiments are for illustrative purposes only and are not subject to the limitations of this structure for patent application.

As shown in FIGS. 1 to 7, the positioner 01 of the present invention comprises a base 10, a shaft 20, a bearing block 30, a pivot 40, a brake structure 50, and a front seat 60, wherein the base 10 has two first sliders 11 protruding from the bottom at intervals opposite to each other in the front and rear, and the upper side of the base 10 is provided with two limiters 12 and forms two supports 13 laterally opposite to each other, each limiter 12 being interposed between the supports 13. The base 10 forms two cavities 14, each cavity 14 forming a baffle 15 at the front. The number of first sliders 11 can be varied as required, but is limited to at least one first slider 11.

The shaft 20 stands upright on the base 10. Each limiter 12 forms a restriction on the diametrical outer circumference of the shaft 20, allowing the shaft 20 to move up and down along its axis but preventing it from moving along its diameter. The number of limiters 12 can be varied as required, but is limited to at least one limiter 12. The limiters 12 can optionally be replaced by other structures that can provide a diametrical restriction on the shaft 20 without restricting the up and down movement of the shaft 20 along its axis, such as a tubular structure.

The bearing block 30 is located at the bottom of the base 10 and at the axial extension of the shaft 20. The bearing block 30 has two bearing faces 32 located on each of the two sides at the top of the bearing block 30, and a bolt 34 axially connects the bearing block 30 and the shaft 20. Specifically, the bolt 34 threads through the bottom of the bearing block 30 and is screwed into the shaft 20, causing the shaft 20 to move the bearing block 30 and positioning the bearing block 30 at a first position 91 or a second position 92, the first position 91 being lower than the second position 92.

The pivot 40 pivotally passes through the shaft 20 along the diameter of the shaft 20.

The brake structure 50 includes a handle 51, two first cams 52, and two second cams 53. The handle 51 extends to form each of the first cams 52, with the first cams 52 being laterally opposed to each other. Each of the second cams 53 is axially connected to each of the first cams 52, with each of the first cams 52 optionally interposed between the second cams 53, and each of the second cams 53 abuts against each of the supports 13. The pivot 40 axially passes through each of the first cams 52 and each of the second cams 53 so that the brake structure 50 can be rotated with the pivot 40 as a center by operating the handle 51.

The front seat 60 is located on the front side of the base 10. The front side of the front seat 60 forms an abutting side 62 and the rear side is opposed to the first cams 52. A second slider 64 protrudes from the bottom of the front seat 60, and two hooks 66 protrude from the rear side of the front seat 60, with each hook 66 entering each cavity 14. Each baffle wall 15 forms an obstacle against each hook 66, thereby relatively limiting the distance between the base 10 and the front seat 60. Each cavity 14 has a length along the direction toward to the front and rear sides of the base 10 that is greater than the length of the hook 66, thereby allowing the base 10 and the front seat 60 to be connected in a relatively front-to-back sliding manner.

Figure 3:
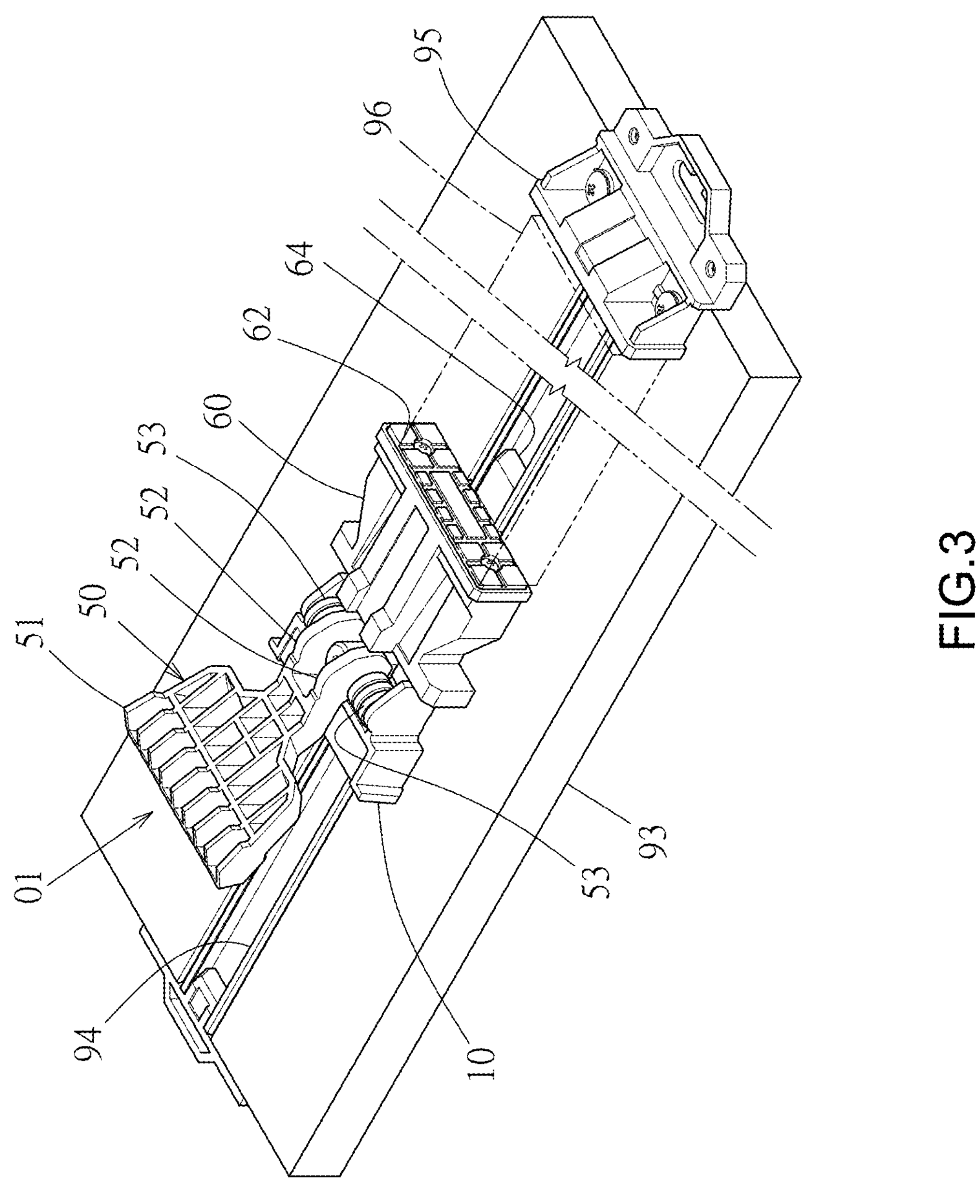
FIG. 3 is a perspective view of the use state of the positioner of the preferred embodiment of the present invention placed on the worktable.
Figure 4:
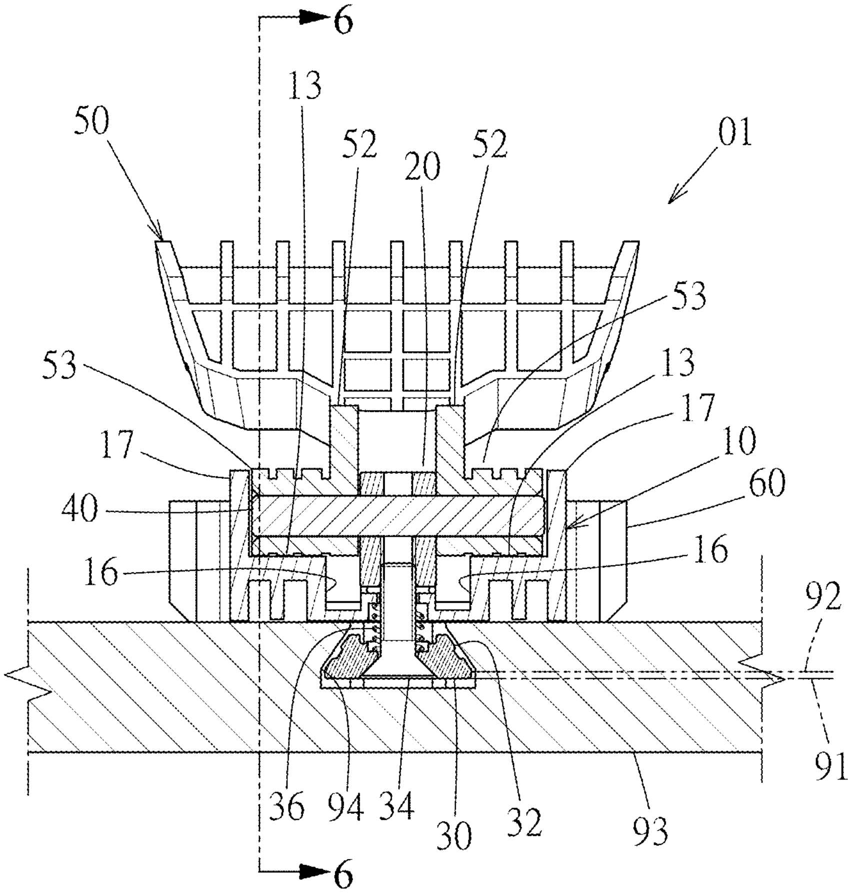
FIG. 4 is a sectional view of the use state of the positioner of the preferred embodiment of the present invention placed on the worktable.
Figure 5:
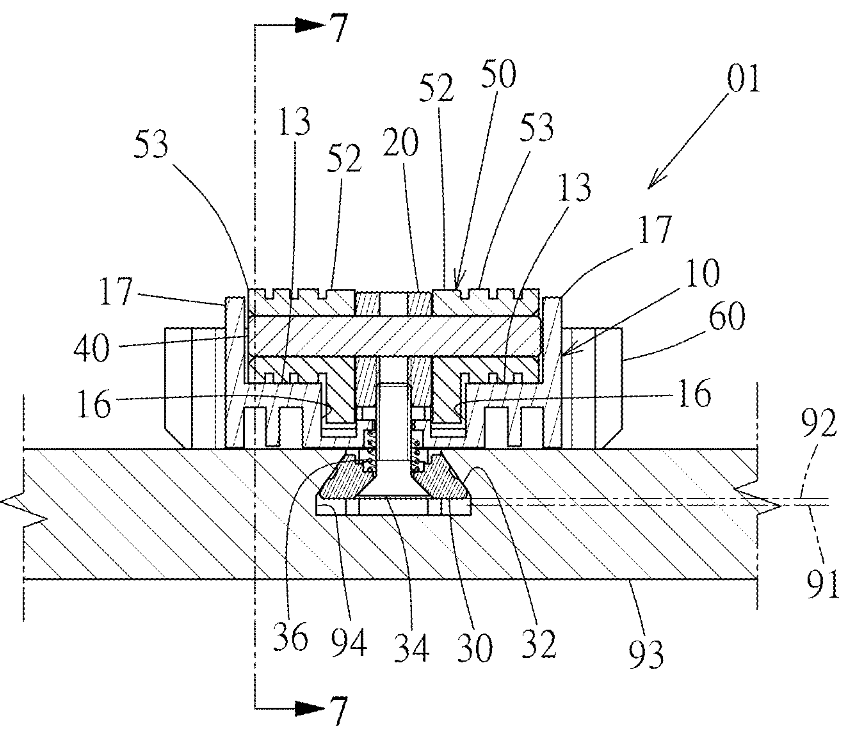
FIG. 5 is a sectional view of the use state of the positioner of the preferred embodiment of the present invention fixed on the worktable.
Figure 6:
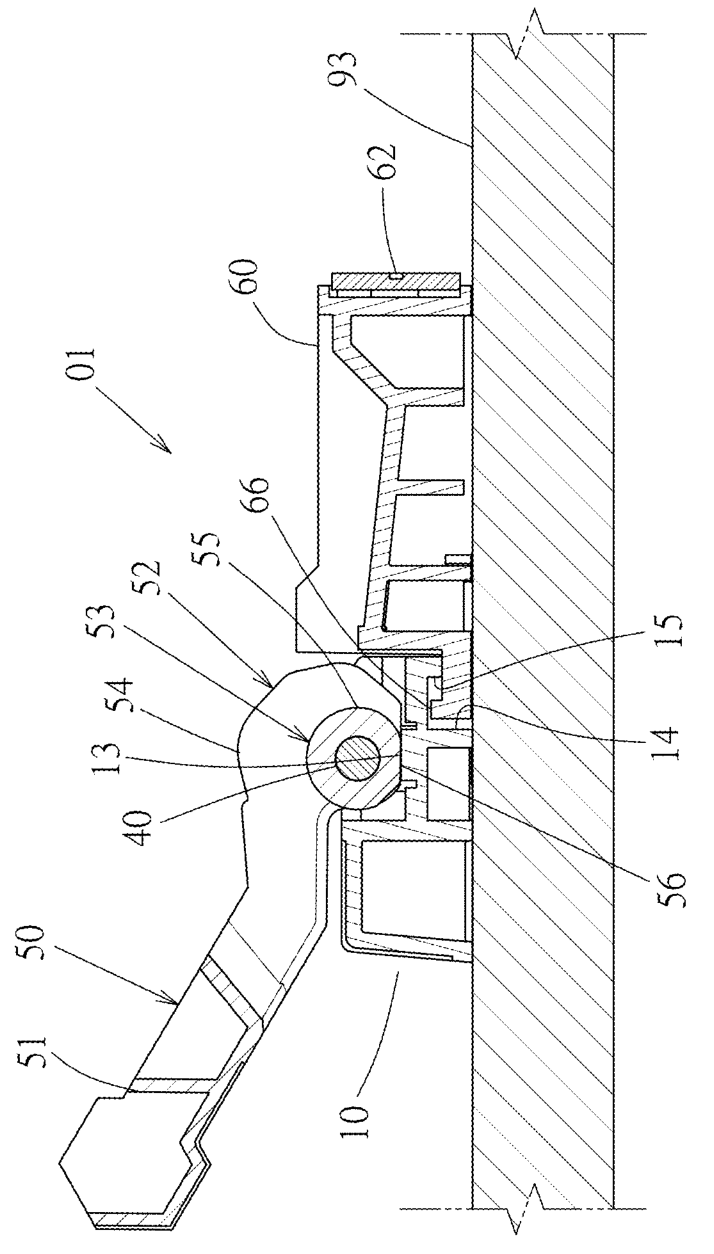
FIG. 6 is a sectional view taken along line 6-6 in FIG. 4.
Figure 7:
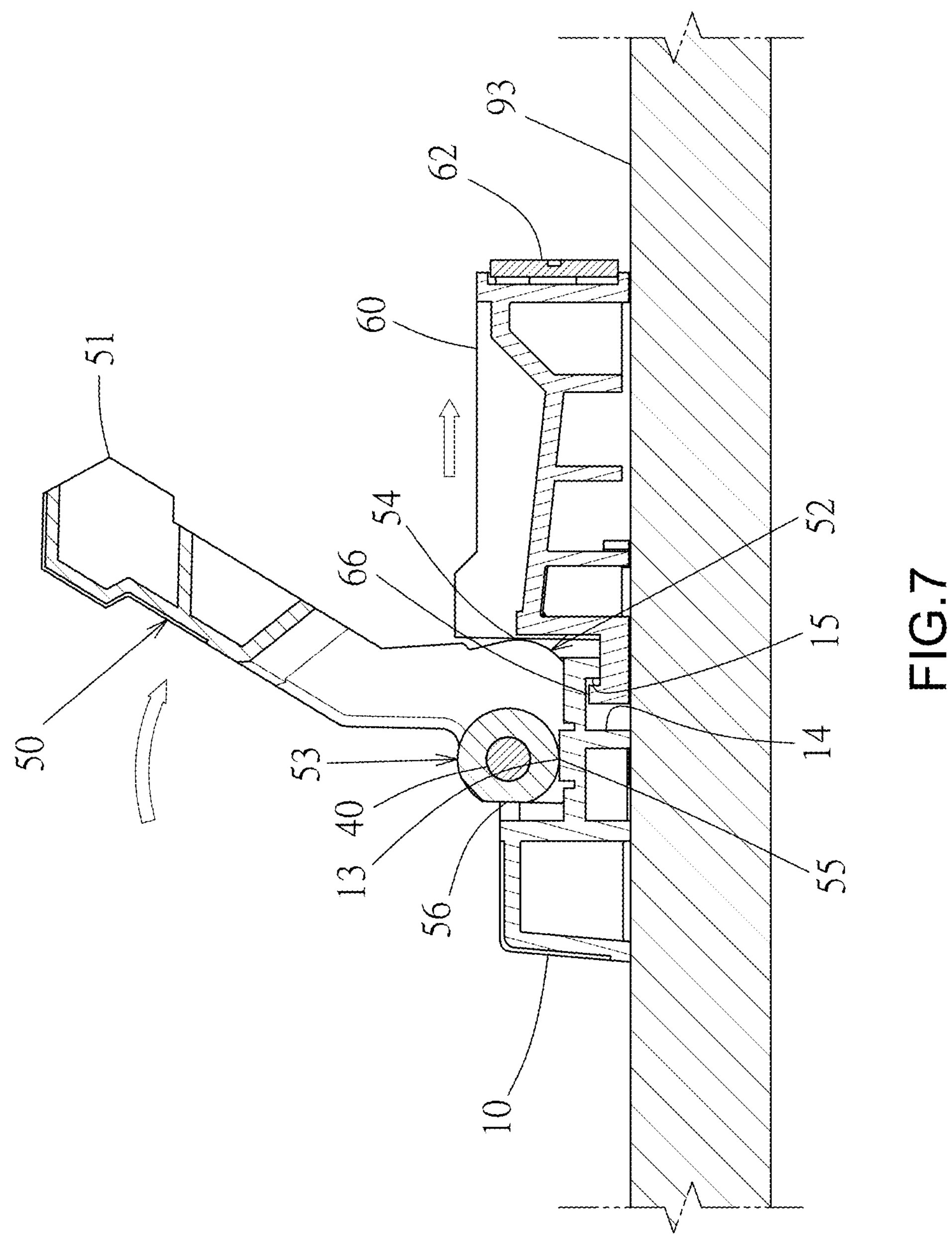
FIG. 7 is a sectional view taken along line 7-7 in FIG. 5.

Each of the first cams 52 respectively protrudes at its circumferential edge to form a pressing surface 54, and each of the first cams 52 respectively presses the front seat 60 to move forward through each pressing surface 54. Each of the second cams 53 respectively protrudes at its circumferential edge to form an abutting surface 55, and each of the second cams 53 respectively presses against each of the supports 13 through each abutting surface 55, thereby restricting the shaft 20 to move upward. As shown in FIGS. 3, 4, and 6, when the bearing block 30 is positioned at the first position 91, the front seat 60 is adjacent to the base 10. As shown in FIGS. 5 and 7, when the brake structure 50 limits the shaft 20 to move upward through the pivot 40 to cause the bearing block 30 to move upward from the first position 91 and be positioned at the second position 92, the pressing surface 54 urges the front seat 60 to move in the direction away from the base 10.

As shown in FIGS. 3, 4, and 6, the positioner 01 can be used to be placed on a worktable 93, and the upper side of the worktable 93 is recessed downwardly to form an elongated dovetail groove 94 that extends to one side of the worktable 93. The worktable 93 is provided with a protruding block 95, and each of the first slider 11, the bearing block 30, and the second slider 64 slides into the dovetail groove 94 from one side of the worktable 93, with the front seat 60 being located between the base 10 and the protruding block 95. At this time, the bearing block 30 is at the first position 91, and the abutting side 62 and the protruding block 95 are opposed to each other along the extension direction parallel to the dovetail groove 94. A workpiece 96 is placed on the upper side of the worktable 93 and is positioned between the front seat 60 and the protruding block 95. By sliding and adjusting the positioner 01 along the dovetail groove 94 so that the abutting side 62 and the protruding block 95 are respectively adjacent to the two opposite sides of the workpiece 96.

As shown in FIGS. 5 and 7, when the handle 51 is operated to drive each of the first cams 52 and each of the second cams 53 to rotate respectively with the pivot 40 as the center, each abutting surface 55 abuts against each support 13 as each second cam 53 rotates, and each second cam 53 limits the shaft 20 to move upwardly through the pivot 40. The shaft 20 then drives the bearing block 30 to move upwardly from the first position 91 to the second position 92 through the bolt 34, and each bearing face 32 abuts tightly against the locations on both sides of the groove opening located above the dovetail groove 94 of the worktable 93, respectively, so that the positioner 01 can be fixed to the worktable 93. As each first cam 52 rotates, each pressing surface 54 respectively urges the front seat 60 to move forward, thereby causing the abutting side 62 to press tightly against the workpiece 96 and the front seat 60, together with the protruding block 95, to clamp and position the workpiece 96.

The positioner 01 can optionally be placed on the worktable (not shown) with a T-slot, and the placement and operation of the positioner 01 is as described above.

The bearing block 30 can optionally be made of rubber or other elastic materials, thereby allowing the bearing block 30 to elastically deform and tightly abut against the worktable 93. Each of the second cams 53 can optionally have at least its abutting surface 55 made of elastic materials, thereby allowing each abutting surface 55 to elastically and tightly abut against each support 13. However, the bearing block 30 or each of the second cams 53 of the positioner 01 can also be made of elastic materials as desired.

The worktable 93 may be a device that is fixed to a machining tool. The positioner 01, together with the protruding block 95, clamps and positions the workpiece 96 on the worktable 93, thereby allowing the fixed workpiece 96 to be machined with a milling cutter or other cutting tool.

The worktable 93 may be a movable device that can move toward or away from the cutting tool, and the cutting tool may be a circular saw or a bandsaw. The positioner 01, together with the protruding block 95, clamps and positions the workpiece 96 on the worktable 93, and by pushing to move the worktable 93, the cutting tool can machine the workpiece 96 as it moves with the worktable 93.

The configuration of each hook 66 with each cavity 14 and each baffle 15 allows the base 10 and the front seat 60 to move together. When changing the position of the positioner 01, by choosing to push and operate either the base 10 or the front seat 60, the positioner 01 can slide back and forth along the dovetail groove 94, thereby improving the convenience of operating the positioner 01 for repositioning.

The upper side of the base 10 is downwardly recessed to form two recesses 16, each recess 16 being located between the limiter 12 and each support 13, and each of the first cams 52 partially entering each recess 16.

The bolt 34 is sleeved with a spring 36, with the two ends of the spring 36 abutting against the bearing block 30 and the base 10, respectively.

The base 10 forms two side walls 17 opposite and adjacent to the two ends of the pivot 40, respectively, so that each side wall 17 can restrict the two axial ends of the pivot 40, respectively.

Each of the second cams 53 forms a recessed surface 56 at its circumferential edge. The maximum distance between each recessed surface 56 and the diametrical center of the pivot 40 is smaller than the distance between each abutting surface 55 and the diametrical center of the pivot 40. The section of the circumferential edge of each second cam 53 between each abutting surface 55 and each recessed surface 56 gradually transitions from each abutting surface 55 to each recessed surface 56, wherein each recessed surface 56 is optionally a flat surface.

Figure 8:
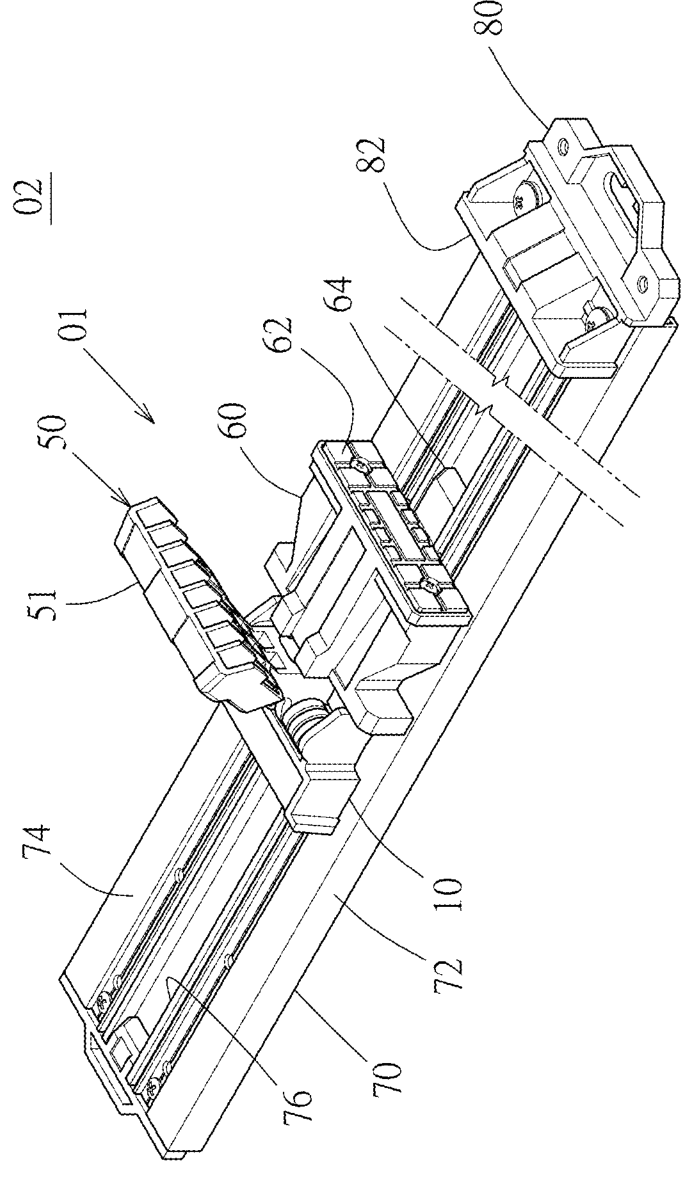
FIG. 8 is a perspective view of the guiding device of the preferred embodiment of the present invention.
Figure 9:
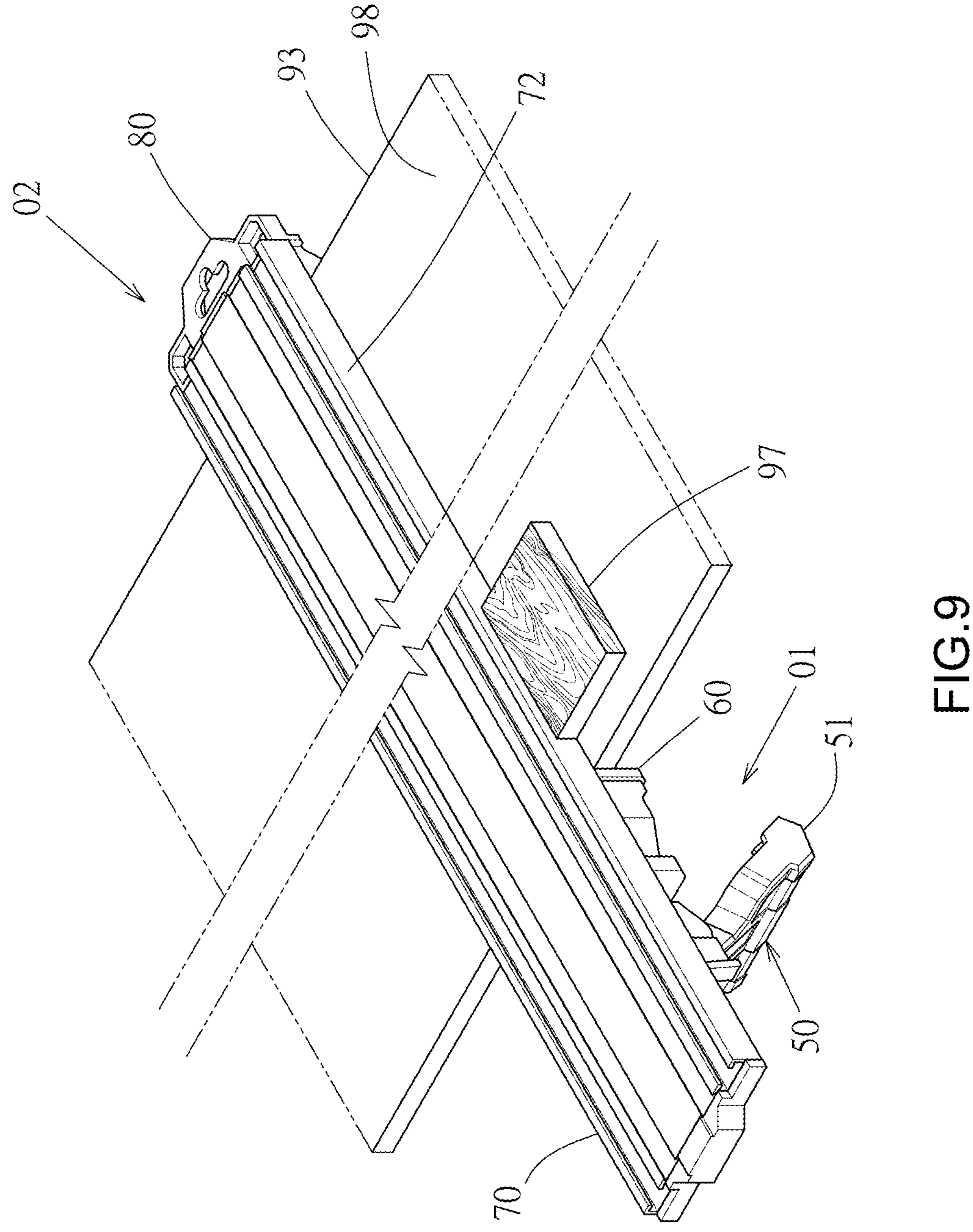
FIG. 9 is a perspective schematic view of the use state of the guiding device of the preferred embodiment of the present invention.

As shown in FIGS. 8 and 9, the guiding device 02 of the present invention comprises a guiding plate 70, an abutting member 80, and the positioner 01. The guiding plate 70 is an elongated, plate-like structure having two guiding sides 72 and a placement side 74. Each guiding side 72 and the placement side 74 are located between the two ends of the guiding plate 70. The guiding sides 72 are opposed to each other, and each is adjacent to the placement side 74. The guiding plate 70 forms a sliding groove 76 between the guiding sides 72, which may be the dovetail groove or the T-slot. This sliding groove 76 extends to at least one end of the guiding plate 70 with the abutting member 80 connected to the other end, and extends to the placement side 74.

Each first slider 11, the bearing block 30, and the second slider 64 slide into the sliding groove 76 from one end of the guiding plate 70, thereby allowing the brake structure 50 to restrain the bearing block 30, with each bearing face 32 abutting against the guiding plate 70, thereby positioning the positioner 01. The front seat 60 is located between the base 10 and the abutting member 80, and the abutting member 80 forms a bearing side 82 opposite to the abutting side 62, thereby allowing the front seat 60 and the abutting member 80 to clamp the worktable 93 therebetween, and each guiding side 72 can be used to provide for a workpiece 97 with lateral abutment and guide the sliding direction of the workpiece 97.

The number of guiding sides 72 formed by the guiding plate 70 can be varied as required, but is limited to at least one guiding side 72. The shape of each guiding side 72 can also be varied as required, and the guiding sides 72 are not limited to being parallel to each other as shown in the drawings.

The invention claimed is:

1. A positioner, comprising:

a base, a first slider protruding from the bottom of the base, a limiter being provided on the upper side of the base, and two supports being formed on the base laterally opposed to each other, wherein the limiter is interposed between the supports, and the base forms two cavities, with each of the cavities forming a baffle wall at the front side;

a shaft standing upright on the base, and the limiter forming a restriction on the diametrical outer circumference of the shaft;

a bearing block located at the bottom of the base, and the bearing block being located at the axial extension of the shaft, with the bearing block having two bearing faces located on each of the two sides at the top of the bearing block;

a bolt axially connecting the bearing block and the shaft, causing the shaft to move the bearing block and being positioned at a first position or a second position, the first position being lower than the second position;

a pivot pivotally passing through the shaft along the diameter of the shaft;

a brake structure including a handle, two first cams, and two second cams, wherein the handle extends to form each of the first cams, and the first cams are laterally opposed to each other; each of the second cams is axially connected to each of the first cams, and each of the first cams is located between the second cams; the pivot axially passes through each of the first cams and each of the second cams, allowing the brake structure to rotate with the pivot as a center; and each of the second cams abuts against each of the supports; and a front seat located at the front side of the base, the front side of the front seat forming an abutting side, and the rear side of the front seat being opposite to each of the first cams; a second slider protruding from the bottom of the front seat, and two hooks protruding from the rear side of the front seat, with each of the hooks entering each of the cavities, and each of the baffle walls forming an obstacle against each of the hooks; each of the cavities having a length along the direction toward the front side and the rear side of the base that is greater than the length of the hook, thereby allowing the base and the front seat to be connected in a relatively front-to-back sliding manner;

wherein, each of the first cams protrudes at its circumferential edge to form a pressing surface, and each of the first cams urges the front seat to move forward through each of the pressing surfaces; each of the second cams protrudes at its circumferential edge to form an abutting surface, and each of the second cams presses against each of the supports through each of the abutting surfaces, thereby restricting the shaft from moving upward; when the bearing block is positioned at the first position, the front seat is adjacent to the base and the brake structure restricts the shaft from moving upwardly through the pivot, and when the bearing block is positioned at the second position, the pressing surface urges the front seat to move in the direction away from the base.

2. The positioner according to claim 1, wherein the upper side of the base is downwardly recessed to form two recesses, each of the recesses is located between the limiter and each of the supports, and each of the first cams partially enters each of the recesses.

3. The positioner according to claim 1, wherein the bolt is sleeved with a spring, with the two ends of the spring abutting against the bearing block and the base, respectively.

4. The positioner according to claim 1, wherein the base forms two side walls opposite and adjacent to the two ends of the pivot, respectively, allowing each of the side walls to restrict the two axial ends of the pivot, respectively.

5. The positioner according to claim 1, wherein each of the second cams forms a recessed surface at its circumferential edge, the maximum distance between each recessed surface and the diametrical center of the pivot is smaller than the distance between each abutting surface and the diametrical center of the pivot, thereby allowing each recessed surface to abut against each support when the bearing block is positioned at the first position.

6. A guiding device, comprising a guiding plate, an abutting member, and the positioner according to claim 1, wherein the guiding plate is an elongated, plate-like structure having a guiding side and a placement side, the guiding side and the placement side being located between the two ends of the guiding plate, respectively, and the guiding side being adjacent to the placement side; the guiding plate forms a sliding groove extending to at least one end of the guiding plate, with the abutting member being connected to the other end and extending to the placement side;

the first slider, the bearing block, and the second slider slide into the sliding groove from one end of the guiding plate, allowing the brake structure to restrain the bearing block, with each of the bearing faces abutting against the guiding plate, thereby positioning the positioner; the front seat is interposed between the base and the abutting member, and the abutting member forms a bearing side opposite to the abutting side, thereby allowing the front seat and the abutting member to clamp a worktable therebetween; and the guiding side provides for a workpiece with lateral abutment and guides the sliding direction of the workpiece.

* * * * *